(12) United States Patent
Saito et al.

(10) Patent No.: US 9,932,060 B2
(45) Date of Patent: Apr. 3, 2018

(54) HEATER UNIT AND STEERING WHEEL

(71) Applicants: KURABE INDUSTRIAL CO., LTD., Hamamatsu-shi, Shizuoka (JP); TOYODA GOSEI CO., LTD., Kiyosu-shi, Aichi (JP)

(72) Inventors: Masatsugu Saito, Hamamatsu (JP); Yuki Naito, Hamamatsu (JP); Bunpei Morita, Kiyosu (JP); Atsushi Nagata, Kiyosu (JP); Norio Umemura, Kiyosu (JP)

(73) Assignees: KURABE INDUSTRIAL CO., LTD., Shizuoka (JP); TOYODA GOSEI CO., LTD., Aichi-pref. (JP)

( * ) Notice: Subject to any disclaimer, the term of this patent is extended or adjusted under 35 U.S.C. 154(b) by 303 days.

(21) Appl. No.: 14/652,468

(22) PCT Filed: Dec. 24, 2013

(86) PCT No.: PCT/JP2013/084454
§ 371 (c)(1),
(2) Date: Jun. 16, 2015

(87) PCT Pub. No.: WO2014/104000
PCT Pub. Date: Jul. 3, 2014

(65) Prior Publication Data
US 2015/0336602 A1 Nov. 26, 2015

(30) Foreign Application Priority Data
Dec. 25, 2012 (JP) .................................. 2012-280549

(51) Int. Cl.
*H05B 3/36* (2006.01)
*B60L 1/02* (2006.01)
(Continued)

(52) U.S. Cl.
CPC .............. *B62D 1/065* (2013.01); *B32B 37/06* (2013.01); *B32B 37/10* (2013.01); *B32B 37/12* (2013.01);
(Continued)

(58) Field of Classification Search
None
See application file for complete search history.

(56) References Cited

U.S. PATENT DOCUMENTS

| 6,727,467 B1 | 4/2004 | Hadzizukic et al. |
| 2002/0033389 A1 | 3/2002 | Sugiyama et al. |

(Continued)

FOREIGN PATENT DOCUMENTS

| JP | S61-218475 A | 9/1986 |
| JP | S62-217592 A | 9/1987 |

(Continued)

OTHER PUBLICATIONS

Supplementary European Search Report dated Aug. 12, 2016 issued in corresponding EP patent application No. 13 86 9171.

(Continued)

*Primary Examiner* — Joseph M Pelham
(74) *Attorney, Agent, or Firm* — Posz Law Group, PLC (57) ABSTRACT

A heater unit includes a pair of substrates formed from a polymeric foam and a cord-shaped heater sandwiched between the pair of substrates. The thickness of a region of each of the substrates at which the cord-shaped heater is disposed is thinned relative to other regions of the substrates in such a manner as to be shaped to the cord-shaped heater and thus the heater unit forms a flat shape. In the heater unit, the substrates are bonded together by an adhesive layer that is composed only from a pressure-sensitive adhesive.

4 Claims, 7 Drawing Sheets

(51) Int. Cl.
*B62D 1/06* (2006.01)
*H05B 3/16* (2006.01)
*H05B 3/56* (2006.01)
*B32B 37/10* (2006.01)
*B32B 37/06* (2006.01)
*B32B 37/12* (2006.01)
*H05B 3/34* (2006.01)
*H05B 3/00* (2006.01)
*H05B 3/18* (2006.01)
*B29L 31/30* (2006.01)

(52) U.S. Cl.
CPC .................. *B62D 1/06* (2013.01); *H05B 3/16* (2013.01); *H05B 3/34* (2013.01); *H05B 3/56* (2013.01); *B29L 2031/3047* (2013.01); *B32B 2605/08* (2013.01); *H05B 3/0014* (2013.01); *H05B 3/18* (2013.01); *H05B 2203/003* (2013.01); *H05B 2203/014* (2013.01); *H05B 2203/017* (2013.01); *Y10T 156/10* (2015.01)

(56) References Cited

U.S. PATENT DOCUMENTS

| 2004/0169028 | A1 | 9/2004 | Hadzizukic et al. | |
| 2011/0073582 | A1* | 3/2011 | Morita | B62D 1/065 219/204 |
| 2012/0129623 | A1* | 5/2012 | Gill | A63B 53/14 473/300 |
| 2015/0122790 | A1* | 5/2015 | Yamada | B62D 1/065 219/204 |
| 2015/0367875 | A1* | 12/2015 | Nonoyama | B62D 1/065 219/204 |
| 2016/0311457 | A1* | 10/2016 | Kato | B62D 1/065 |

FOREIGN PATENT DOCUMENTS

| JP | H06-060964 A | 3/1994 |
| JP | 10-284220 A | 10/1998 |
| JP | 2003-317905 A | 11/2003 |
| JP | 2007-134341 A | 5/2007 |
| JP | 4202071 B2 | 10/2008 |
| JP | 2008-311110 A | 12/2008 |
| JP | 2008-311111 A | 12/2008 |
| JP | 2011-121477 A | 6/2011 |
| JP | 2011-181316 A | 9/2011 |
| WO | 2011/105765 A2 | 9/2011 |

OTHER PUBLICATIONS

Search Opinion dated Aug. 12, 2016 issued in corresponding EP patent application No. 13 86 9171.

International Search Report of the International Searching Authority dated Feb. 18, 2014 for the corresponding international application No. PCT/JP2013/084454 (and English translation).

Office Action dated May 9, 2017 in the corresponding Japanese Patent Application No. 2013-238405 (and English translation).

* cited by examiner

Fig. 9

HEATER UNIT AND STEERING WHEEL

CROSS REFERENCE TO RELATED APPLICATIONS

This application is a U.S. national stage application of PCT/JP2013/084454 filed on Dec. 24, 2013, and is based on Japanese Patent Application No. 2012-280549 filed on Dec. 25, 2012, the entire contents of which are incorporated herein by reference.

TECHNICAL FIELD

The present invention relates to a steering wheel for use in an automobile, a ship or the like, by way of example, and to a heater unit used to heat a rim of the steering wheel. Particularly, the present invention relates to a steering wheel and a heater unit that would not bring a user a sense of discomfort.

BACKGROUND

There has been a proposal to mount a heater unit on a steering wheel rim in order to warm driver's hands in cold weather. The patent documents 1 and 2 listed below, by way of example, disclose a heater unit for use in a steering wheel which is composed of a substrate and a cord-shaped heater arranged on the substrate in a predetermined pattern. The patent documents disclose various material such as foamed resin sheet, foamed rubber sheet, rubber sheet, non-woven fabric, woven fabric or the like as the substrate.

PATENT DOCUMENTS

Patent Document 1: JP2003-317905A
Patent Document 2: JP2011-121477A

Figure 9:
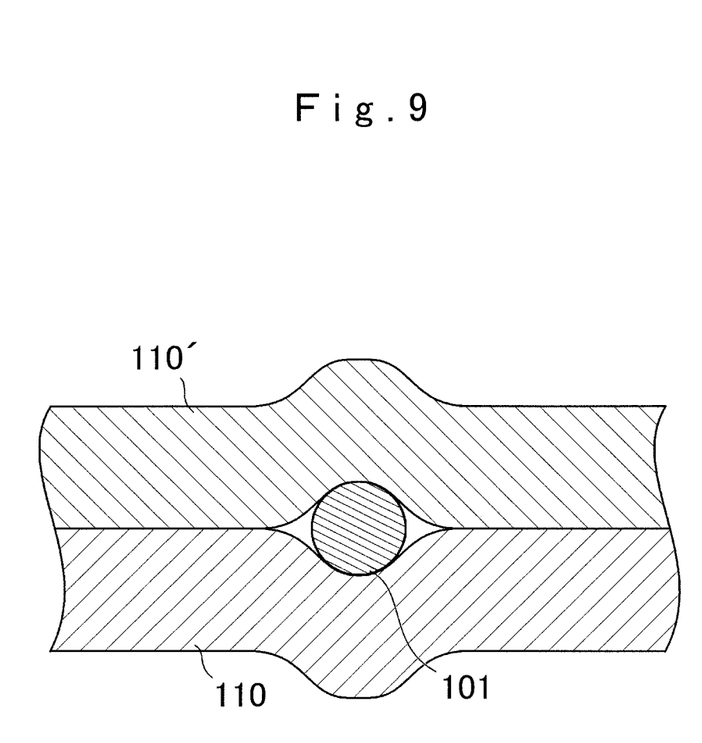
FIG. 9 is an enlarged cross-sectional view showing an essential part of a conventional heater unit.

However, in conventional heater units such as that disclosed in the above-listed patent documents 1 and 2, a cord-shaped heater 101 is merely disposed between the substrates 110 and 110' as shown in FIG. 9, which causes a thickness at a region where the cord-shaped heater 101 is disposed. This brings a user a sense of unevenness when the driver holds the steering wheel, and causes him a sense of discomfort during steering.

SUMMARY

The present invention has been contemplated to solve such problems of the conventional art, and its object is to provide a steering wheel that will not bring a user a sense of discomfort during steering and a heater unit used in the steering wheel.

The heater unit according to the invention includes a pair of substrates that are formed from a polymeric foam and a cord-shaped heater that is sandwiched between the substrates. The thickness of a region of each of the substrates at which the cord-shaped heater is disposed is thinned relative to other regions of the substrates in such a manner as to be shaped to the cord-shaped heater, such that the heater unit forms a flat shape.

It is conceivable that the pair of the substrates are bonded together by an adhesive layer that is composed only from a pressure-sensitive adhesive. This configuration will not hinder the retractility of the heater unit and will be suitable for bonding the substrates together.

It is further conceivable that the cord-shaped heater includes on an outmost layer thereof a thermal fusible region. This configuration will help fix the cord-shaped heater on the substrates easily only with the aid of heat but with no need of sewing.

The steering wheel according to the invention includes a rim for holding for steering, the rim including the heater unit described above, a rim core and a cladding member for covering the rim core. The cladding member includes a base cladding that covers the rim core and a cover cladding that is disposed on an outer surface of the rim and the heater unit is disposed between the base cladding and the cover cladding.

The method for manufacturing a heater unit according to the invention includes: providing a pair of substrates that are formed from a polymeric foam and a cord-shaped heater; arranging the cord-shaped heater in a predetermined pattern between the substrates; and applying heat and pressure to the substrates by a flat plate such that the thickness of a region of each of the substrates at which the cord-shaped heater is disposed is thinned relative to other regions of the substrates in such a manner as to be shaped to the cord-shaped heater such that the heater unit forms a flat shape.

According to the invention, users will not feel a sense of discomfort during steering since the heater unit has a flat shape with no unevenness due to the presence of the cord-shaped heater.

DETAILED DESCRIPTION

Preferred embodiments of the present invention are described below with reference to the accompanying drawings.

First Embodiment

Figure 5:
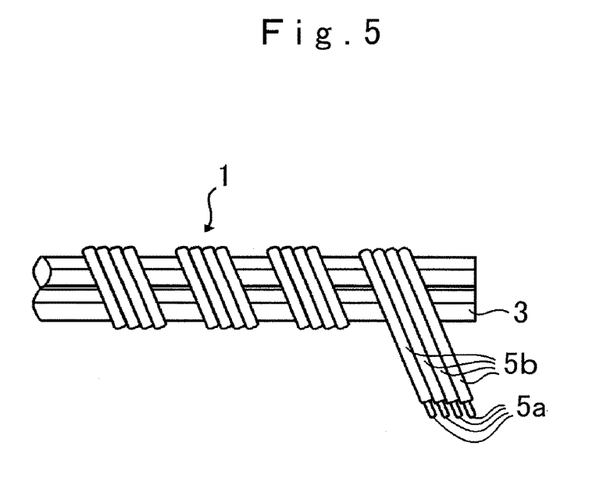
FIG. 5 is a side view showing part of a cord-shaped heater used in the invention.

A cord-shaped heater 1 according to the first embodiment of the invention is now described. The cord-shaped heater 1 is configured as depicted in FIG. 5: the cord-shaped heater 1 includes a heater core 3 which is composed of bundles of aromatic polyamide fiber and has an outer diameter of about 0.2 mm, and seven conductor wires 5a lined up together and wrapped around the heater core 3 in a helical fashion at 1.00 mm intervals. Each of the conductor wires 5a is composed of an alloy wire of tin and copper and has a diameter of 0.08 mm, and is covered with an insulation covering 5b of polyurethane with an about 0.005 mm thickness. The cord-shaped heater 1 is configured as described above and its finished outer diameter is 0.38 mm.

A first substrate 10 and a second substrate 10', between which the cord-shaped heater 1 is disposed, are now described. Each of the substrates 10 and 10' according to the first embodiment is formed from foamed polyurethane resin with an apparent density of 0.03 g/cm$^3$ (JIS K 7222), a hardness of 11.77 (JIS K6400-2) and a 4 mm thickness.

Figure 7:
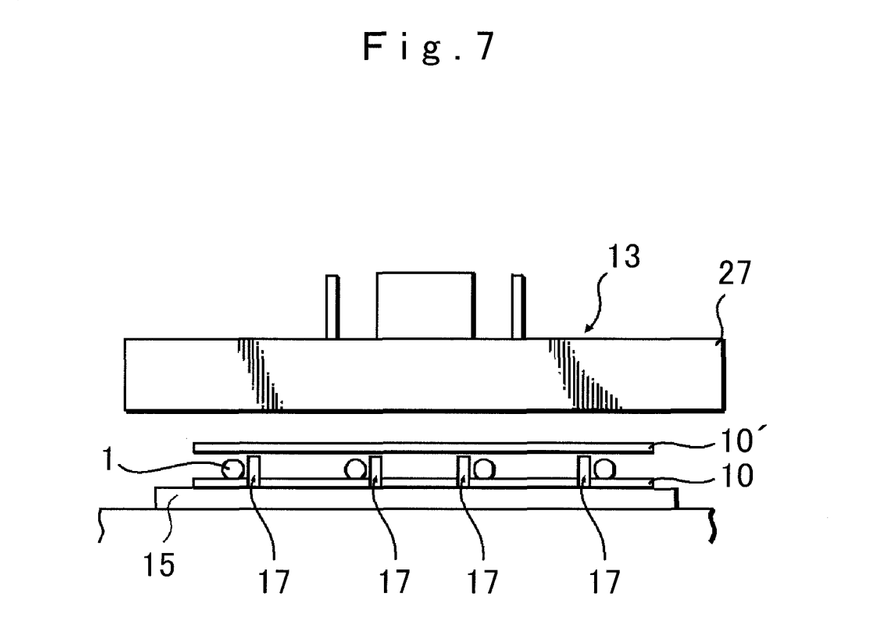
FIG. 7 depicts a hot-press heater manufacturing device used in the invention.
Figure 8:
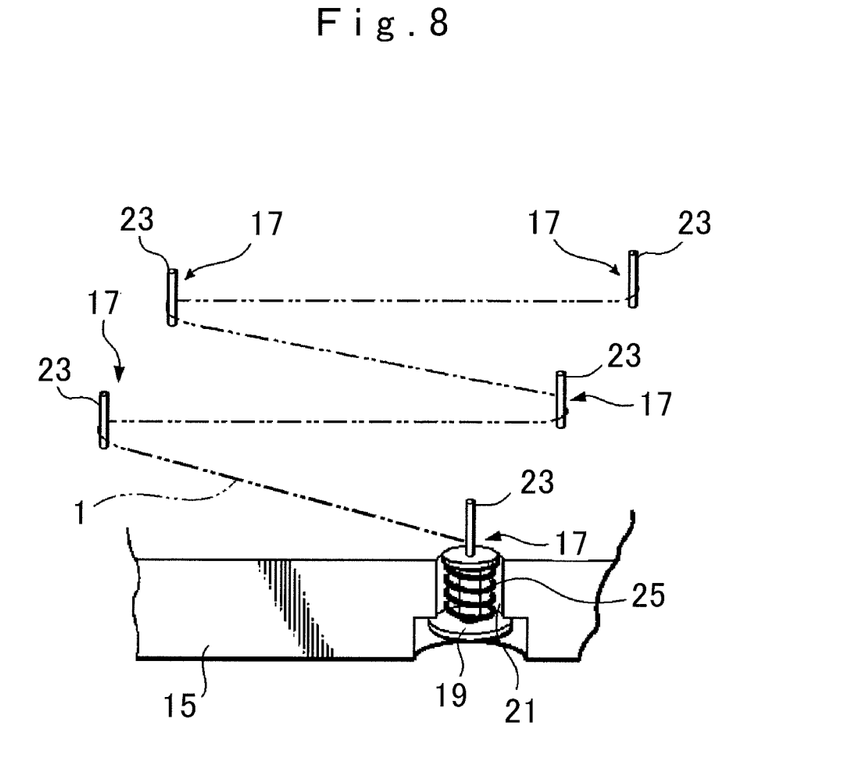
FIG. 8 is a partial perspective view showing the way a cord-shaped heater is arranged in a predetermined pattern on the heater unit of the invention.

The arrangement of the cord-shaped heater 1 between the substrate 10 and the substrate 10' in a predetermined pattern is now described. FIG. 7 depicts the configuration of a hot-press heater manufacturing device 13 for heating and pressurizing the substrates on which the cord-shaped heater 1 is arranged. The manufacturing device 13 includes a bottom platen 15 with a plurality of hook mechanisms 17. As shown in FIG. 8, each of the hook mechanisms 17 includes a pin section 19 which is inserted into a hole 21 bored in the bottom platen 15 from below. The pin section 19 is provided, at the top, with a hook member 23 which is formed into a nail. The hook member 23 is movable in the axial direction and is constantly biased upwardly by a coil spring 25. As indicated by hypothetical lines in FIG. 8, the cord-shaped heater 1 is wound around the hook members 23 of the hook mechanisms 17 one after another, thus is arranged in a predetermined pattern on the first substrate 10.

Back to FIG. 7, there is provided above the hook mechanisms 17 a heat platen 27 which is reciprocably movable in an up and down direction. That is, the first substrate 10 is laid over the bottom platen 15 so the hook members 23 penetrate the substrate 10, and the cord-shaped heater 1 is wound around the hook members 23 of the hook mechanisms 17 one after another, thus is arranged in a predetermined pattern on the substrate 10. Then the second substrate 10', which has on the surface an adhesive layer (not shown), is laid over there, and the heat platen 27 is moved downward such that heat and pressure are applied to the cord-shaped heater 1 and substrates 10 and 10'. Thus the substrates 10 and 10' are compressed as well as the substrates 10 and 10' and the cord-shaped heater 1 are bonded and fixed together with the adhesive layer. When the heat platen 27 is moved downward to apply heat and pressure to the substrates 10 and 10', the hook members 23 of the hook mechanisms 17 move downward against the biasing force of the coil springs 25.

Figure 1:
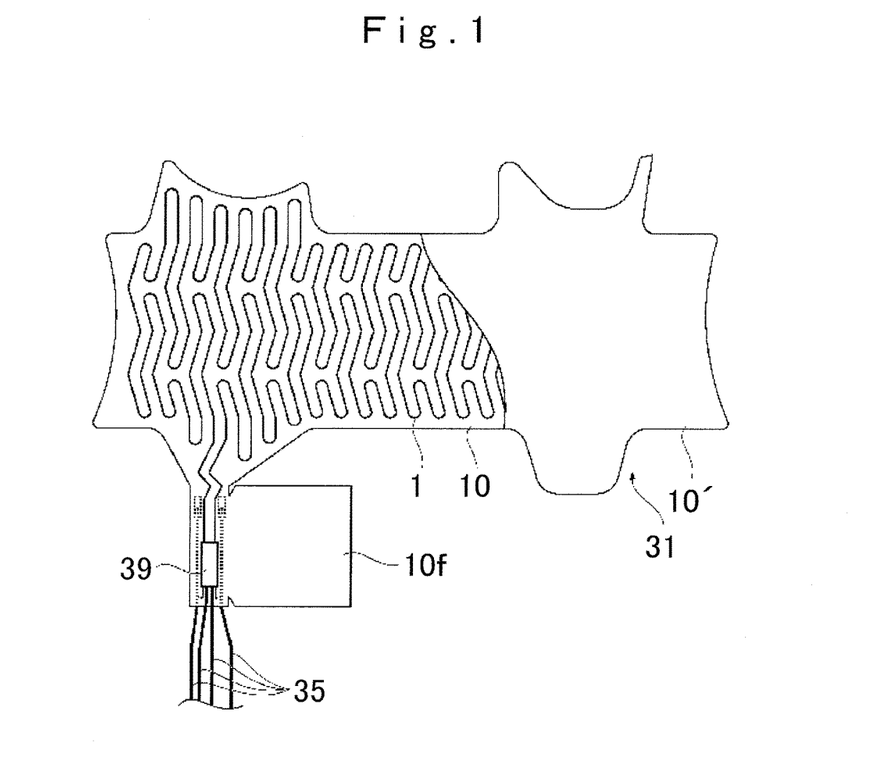
FIG. 1 is a partial plan view of a heater unit according to the invention.
Figure 2:
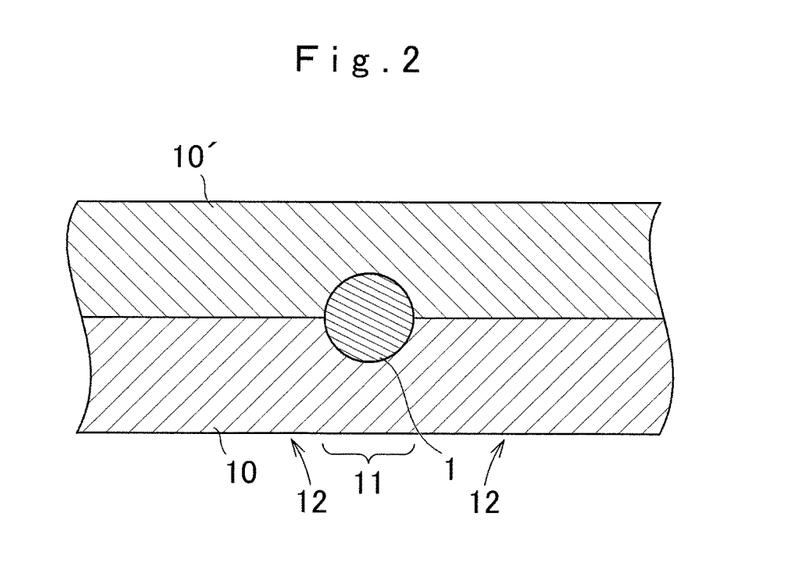
FIG. 2 is an enlarged cross-sectional view showing an essential part of the heater unit of the invention.

The operation described as above provides a heater unit 31 for a steering wheel shown in FIGS. 1 and 2. FIG. 2 is an enlarged cross-sectional view of an essential part of FIG. 1. Since the substrates 10 and 10' are compressed by the flat heat platen 27, the region where the cord-shaped heater 1 is arranged is pressurized even more forcefully than other regions. Accordingly, the regions of the substrates 10 and 10' where the cord-shaped heater 1 is disposed are thinned relative to other regions in such a manner as to be shaped to the cord-shaped heater 1. As a result, the heater unit 31 is formed into a flat shape with no unevenness even at the region where the cord-shaped heater 1 is disposed. In other words, the region where the cord-shaped heater 1 is disposed, namely, a heater-allocated region 11, and the region where the cord-shaped heater 1 is not disposed, i.e., an unallocated region 12, have the same thicknesses and form a flat plate.

The heater unit 31 obtained as described above has an enhanced mechanical strength since the substrates 10 and 10' are compressed and has a high density. The thickness of the heater unit obtained in this embodiment was 1.00 mm. The minimum thickness of each of the substrates 10 and 10' of the region where the cord-shaped heater 1 is disposed, i.e., of the heater-allocated region 11, was 0.31 mm while the thickness of each of the substrates 10 and 10' of the region where the cord-shaped heater 1 is not disposed, i.e., of the unallocated region 12, was 0.50 mm.

Figure 3:
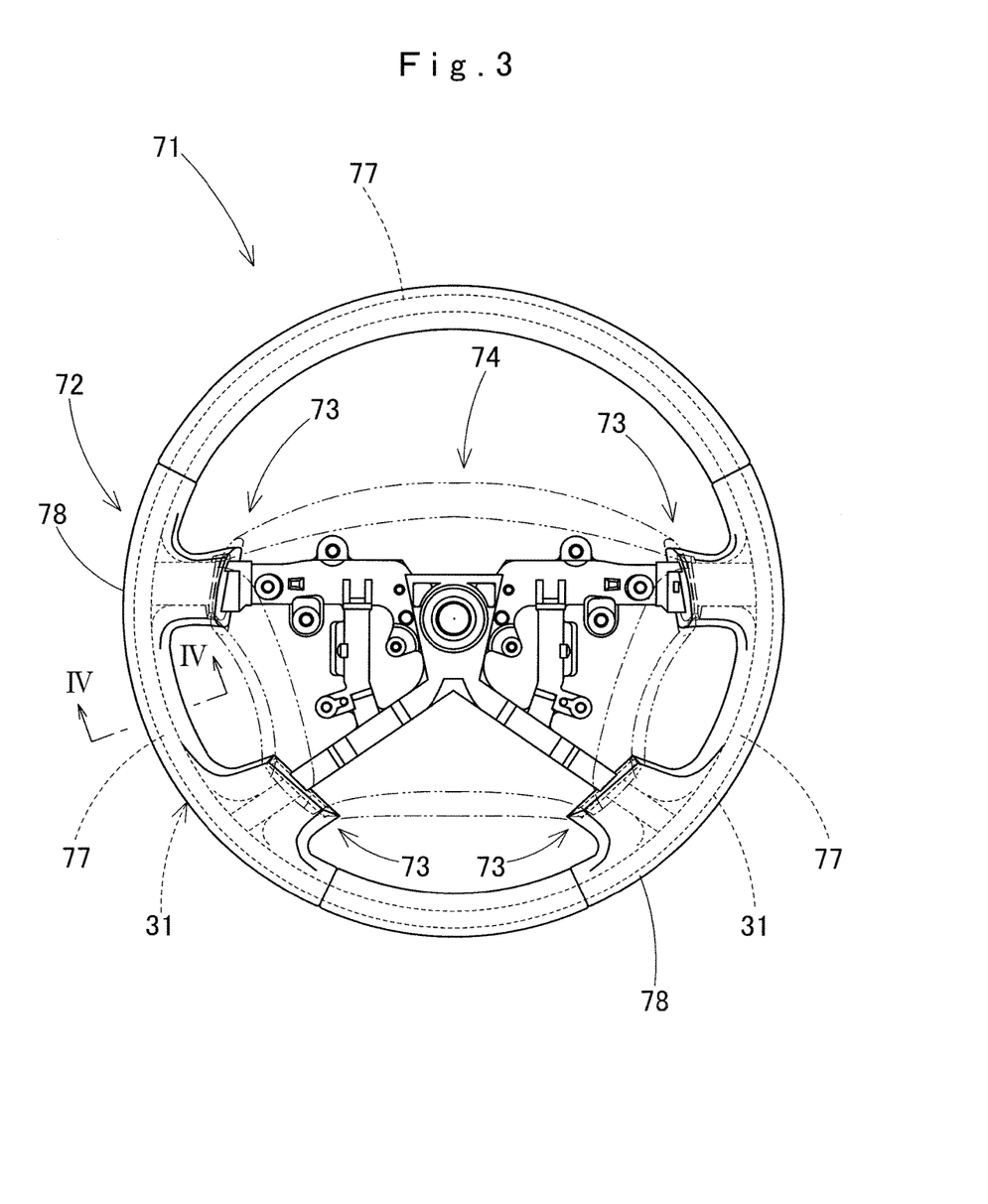
FIG. 3 is a plan view of a steering wheel on which the heater unit of the invention is mounted.

As shown in FIG. 3, the steering wheel 71 on which the heater unit 31 is mounted includes a rim 72, spokes 73 and a boss 74. The rim 72 is for holding for steering and includes a rim core 77 and a cladding member 78 composed of synthetic resin, textile, leather or the like. The cladding member 78 includes a base cladding 79 which is mounted around the rim core 77 and formed from urethane or the like and a cover cladding 80 disposed on the outer surface. The heater unit 31 is disposed between the base cladding 79 and the cover cladding 80, and is connected to a lead wire (not shown), which is wired through the spokes 73 and boss 74 and supplies electricity to the heater unit 31.

Second Embodiment

Figure 6:
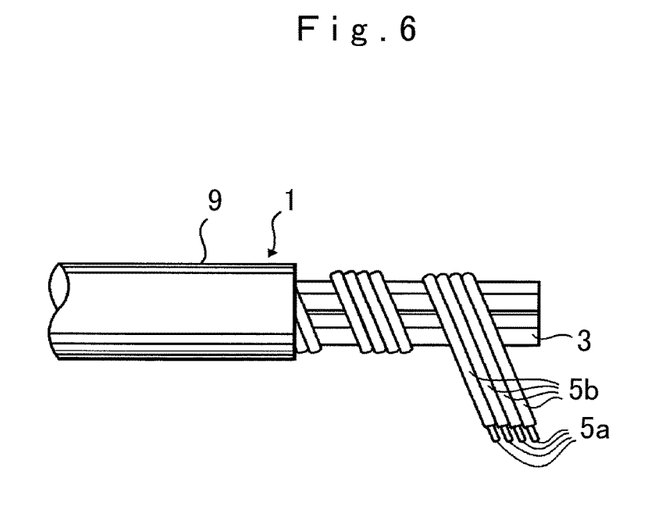
FIG. 6 is a side view showing part of a cord-shaped heater used in the invention.

A cord-shaped heater 1 according to the second embodiment of the invention is now described. The cord-shaped heater 1 is configured as illustrated in FIG. 6: the cord-shaped heater 1 includes a heater core 3 which is a bundle of aromatic polyamide fiber and has an outer diameter of about 0.2 mm, and seven conductor wires 5a lined up together and wrapped around the heater core 3 in a helical fashion at 1.00 mm intervals. Each of the conductor wires 5a is composed of an alloy wire of tin and copper and has a diameter of 0.08 mm, and is covered with an insulation covering 5b of polyurethane with an about 0.005 mm thickness. The heater core 3 and the conductor wires 5a are covered by a thermal fusible region 9 which is formed from polyethylene resin containing flame retardant by extrusion and has a 0.25 mm thickness. That is, the cord-shaped heater 1 includes the thermal fusible region 9 on the outmost layer. The cord-shaped heater 1 is thus configured and its finished outer diameter is 0.9 mm.

A first substrate 10 and a second substrate 10', between which the cord-shaped heater 1 is disposed, are now described. Each of the substrates 10 and 10' according to the second embodiment is formed from foamed polyurethane resin with an apparent density of 0.03 g/cm$^3$ (JIS K 7222), a hardness of 11.77 (JIS K6400-2) and a 4 mm thickness.

The arrangement of the cord-shaped heater 1 between the substrate 10 and the substrate 10' in a predetermined pattern is now described. FIG. 7 depicts the configuration of a hot-press heater manufacturing device 13 for heating and pressurizing the substrates on which the cord-shaped heater 1 is arranged. The manufacturing device 13 includes a bottom platen 15 with a plurality of hook mechanisms 17. As shown in FIG. 8, each of the hook mechanisms 17 includes a pin section 19 which is inserted into a hole 21 bored in the bottom platen 15 from below. The pin section 19 is provided, at the top, with a hook member 23 which is formed into a nail. The hook member 23 is movable in the axial direction and is constantly biased upwardly by a coil spring 25. The first substrate 10 is laid over the bottom platen 15 so the hook members 23 penetrate the substrate 10. Then as indicated by hypothetical lines in FIG. 8, the cord-shaped heater 1 is wound around the hook members 23 of the hook mechanisms 17 one after another, thus is arranged in a predetermined pattern on the first substrate 10.

Back to FIG. 7, there is provided above the hook mechanisms 17 a heat platen 27 which is reciprocably movable in an up and down direction. That is, the first substrate 10 is laid over the bottom platen 15 so the hook members 23 penetrate the substrate 10, and the cord-shaped heater 1 is wound around the hook members 23 of the hook mechanisms 17 one after another, thus is arranged in a predetermined pattern on the substrate 10. Then the second substrate 10', to which a double-sided tape is attached, is laid over there, and the heat platen 27 is moved downward such that heat and pressure are applied to the cord-shaped heater 1 and substrates 10 and 10'. Thus the substrates 10 and 10' are bonded and fixed together through the medium of the cord-shaped heater 1 due to thermal fusion of the thermal fusible layer (thermal fusible region) 9 of the cord-shaped heater 1 as well as the substrates 10 and 10' are compressed. When the heat platen 27 is moved downward to apply heat and pressure to the substrates 10 and 10', the hook members 23 of the hook mechanisms 17 move downward against the biasing force of the coil springs 25.

The operation described as above provides a heater unit 31 for a steering wheel shown in FIGS. 1 and 2. FIG. 2 is an enlarged cross-sectional view of an essential part of FIG. 1. Since the substrates 10 and 10' are compressed by the flat heat platen 27, the region where the cord-shaped heater 1 is arranged (namely, the heater-allocated region 11) are pressurized even more forcefully than other regions. Accordingly, the regions of the substrates 10 and 10' where the cord-shaped heater 1 is disposed (the heater-allocated regions 11) are thinned relative to other regions (namely, the unallocated region 12) in such a manner as to be shaped to the cord-shaped heater 1. As a result, the heater unit 31 is formed into a flat shape with no unevenness even at the region where the cord-shaped heater 1 is disposed. The heater unit 31 obtained as described above has an enhanced mechanical strength since the substrates 10 and 10' are compressed and has a high density. The thickness of the heater unit obtained in this embodiment was 1.00 mm. The minimum thickness of each of the substrates 10 and 10' of the region where the cord-shaped heater 1 is disposed was 0.26 mm while the thickness of each of the substrates 10 and 10' of the region where the cord-shaped heater 1 is not disposed was 0.50 mm. In this embodiment, the cord-shaped heater 1 was formed into a flat shape as well since heat and pressure deformed the thermal fusible layer 9 of the cord-shaped heater 1.

Figure 4:
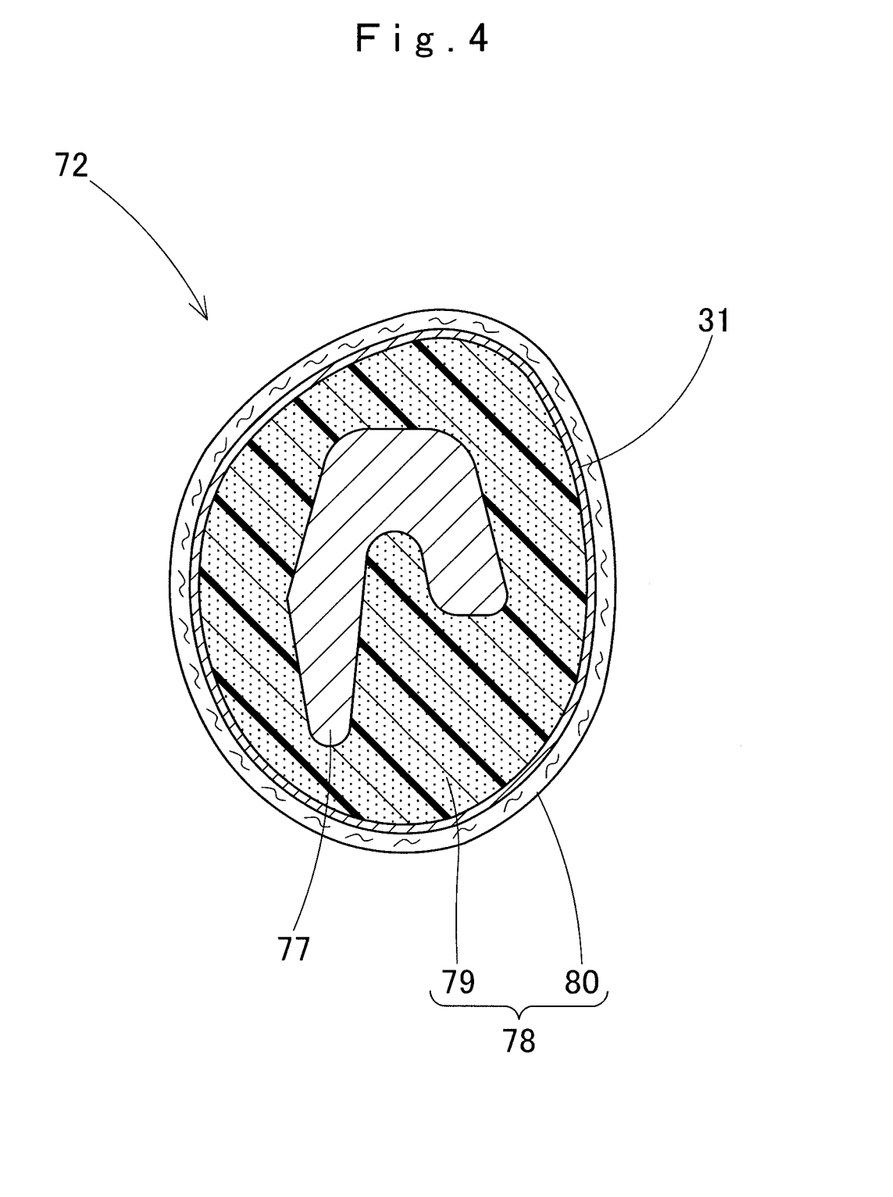
FIG. 4 is a cross-sectional view of the steering wheel on which the heater unit of the invention is mounted, taken along line IV-IV of FIG. 3.

Opposite ends of the cord-shaped heater 1 obtained as described above according to the first and second embodiments are taken out and connected to lead wires 35 which connect the cord-shaped heater 1 and a temperature control device 39 to a connector (not shown). The temperature control device 39 is located on the cord-shaped heater 1 in order to detect the heat of the heater 1 and control the temperature of the heater unit. The substrates 10 and 10' may include a projected region 10f for wrapping the connection area of the temperature control device 39, the cord-shaped heater 1 and the lead wires 35 for protecting them from impact or the like. From this viewpoint, the projected region 10f may be configured so as not to be heated or pressurized. The lead wires 35 are connected to an electrical system (not shown) of a vehicle via the above-described connector. As shown in FIG. 4, the heater unit 31 configured as described above is mounted around the base cladding 79 of the steering wheel 71 and the cover cladding 80 is wrapped over there, thus the heater unit 31 is disposed between the base cladding 79 and cover cladding 80.

An adhesive layer (not shown) is formed on each of the substrates 10 and 10' for bonding the heater unit 31 and the cladding members 78 of the steering wheel (i.e., the base cladding 79 and cover cladding 80). The adhesive layer is preferably formed by providing an adhesive layer composed only of an adhesive on a release sheet and transferring the adhesive layer from the release sheet to surfaces of the substrates 10 and 10'. This way the adhesive will not permeate the substrates 10 and 10' and the adhesive stays only on the surfaces of the substrates 10 and 10'.

Each of the heater units 31 according to the first and second embodiments was mounted on a rim 72 of a steering wheel 71 as shown in FIG. 3 and in that state put to a proof to test a sense of discomfort. The proof was conducted as follows: ten users held the rim 72 of each of the steering wheels 71 and steered it to the left and right each ten times. Then the users answered to an inquiry about whether they felt an unevenness due to the presence of the cord-shaped heater 1. No user felt a sense of discomfort from either of the steering wheel rims 72 obtained from the first and second embodiments.

The present invention should not be limited to the foregoing embodiments. Any known cord-shaped heaters may be used as the cord-shaped heater 1. By way of example, the following cord-shaped heater may be employed as the cord-shaped heater 1: a cord-shaped heater as described in JP 4202071 B that includes a heater core, a heating element which is composed of a plurality of heating wires lined up together and wrapped around the heater core, an insulant layer formed of FEP and a thermal fusible layer of polyethylene, where necessary, mounted therearound; a cord-shaped heater as described in the specification of Japanese Patent Application No. 2007-158452 (i.e., JP2008-311110A) in which a heater core 3 has heat-shrinkable property and thermal melting property; a cord-shaped heater as described in the specification of Japanese Patent Application No. 2007-158453 (i.e., JP2008-311111A) in which a heating element is composed of a plurality of conductor wires lined up together, each of the conductor wires being covered by an insulation covering; and a cord-shaped heater as described in JP 2007-134341 A in which a heating element is composed of conductor wires each of which is a copper alloy wire containing silver including solid-solution of copper and copper-silver eutectic alloy in the form of fiber. When a cord-shaped heater is disposed between a pair of substrates 10 and 10', the cord-shaped heater may be composed of bare heating wires which are not insulated.

The substrate 10 should not be limited to foamed polyurethane resin, either. Various polymeric foams such as a foamed resin sheet made from other material or a foamed rubber sheet may be used as the substrate 10. Especially, ones with high retractility will be preferable and ones which are controlled in hardness so as not to exhibit unevenness on the surface due to the presence of a cord-shaped heater will be preferable. The hardness would be controlled by controlling an expansion ratio, forming closed pores or interconnected pores, or using a material with desired hardness adapted to the goal. The material can be selected from various resin, rubber or thermoplastic elastomer such as polyurethane resin, chloroprene rubber, silicone resin, silicone rubber, neoprene rubber, diene rubber, nitrile rubber, natural rubber, polyethylene resin, polypropylene resin and ethylene-vinyl acetate copolymer. Further, more than one substrates may be used. The cord-shaped heater 1 may be sandwiched between a pair of substrates 10 and 10' as described in the first and second embodiments, and more than one substrates 10 may be used in a laminated fashion. In this instance, the substrates may be made from different materials. In a configuration where more than one substrates 10a sandwich the cord-shaped heater 1, it will be preferable that a substrate located on a side toward the cover cladding 80, i.e., toward the outer surface, is softer than a substrate located on a side toward the rim core 77. Specifically, it is conceivable to form the substrate 10 to be located on a side toward the cover cladding 80 from a material with high expansion ratio, or from a material with low hardness. Such configuration will prevent an unevenness due to the presence of the cord-shaped heater from appearing on the surface. Moreover, if the adhesive layer is so configured that an adhesive does not permeate interior gaps of the substrate 10 such as pores, the substrate 10 will not harden or lose retractility, thereby keeping the original texture.

The cover cladding 80 may be provided with a cushioning layer of cushion rubber or the like in order to improve soft touch of the steering wheel rim 72. In this instance, the cover cladding 80 will include a surface layer of leather or the like to be disposed on the outer surface and a cushioning layer disposed on a backside of the surface layer.

The cord-shaped heater 1 may be set on the substrate 10 by other methods than adhesion and fixing by application of heat and pressure. By way of example, the cord-shaped heater 1 may be fixed on the substrate 10 by sewing or the like. Further, when heat and pressure are applied to the substrates 10 and 10', not only the heat platen 27 but also the bottom platen 15 may be heated. In such an instance, it will be conceivable to change the temperature of the heat platen 27 from that of the bottom platen 15 in order to differentiate the compression ratios, i.e., the porosities, of the substrates 10 and 10'.

Further, various adhesive layers such as an adhesive layer which is comprised of a pressure-sensitive adhesive of acrylic polymer and uses no tape substrate and an adhesive layer in which adhesive is disposed on both sides of a polypropylene film may be employed as the adhesive layer. It will be preferable if the adhesive has, by itself, such flame proofness that would meet the requirements of the flammability testing of interior materials for motor vehicles according to FMVSS No. 302, since it will improve the flame proofness of the heater unit. Further, the adhesive layer will be preferably comprised of a pressure-sensitive adhesive only in order not to hinder the retractility of the heater unit.

INDUSTRIAL APPLICABILITY

According to the invention, users will not feel a sense of discomfort during steering. Such a heater unit will be preferably used in a steering wheel for use, by way of example, in motor vehicles, ships, various transport vehicles, various agricultural vehicles, various construction equipment, in order to warm its rim. Taking advantage of the configuration having no unevenness due to the presence of a cord-shaped heater, the heater unit of the invention may be applicable not only to a steering wheel but also to an electric blanket, an electric carpet, a vehicle seat heater, a steering heater, a heating toilet seat, a heater for a defogging mirror, a heating cooker, a heater for a floor heating system, or a heater for clothing.

The invention claimed is:

1. A method for manufacturing a heater unit comprising:
providing a first substrate and a second substrate, each of which is formed from a polymeric foam, and a cord-shaped heater;
arranging the first substrate on a plurality of hook members, which are movable downwardly such that the hook members penetrate the first substrate;
arranging the cord-shaped heater in a predetermined pattern on the first substrate by winding the cord-shaped heater around the hook members one after another;
laying the second substrate over the first substrate; and
applying heat and pressure to the first and second substrates by a flat plate such that the hook members move downwards and the first and second substrates sandwich the cord-shaped heater and such that a thickness of a region of each of the substrates at which the cord-shaped heater is disposed is thinned relative to other regions of the substrates in such a manner as to be shaped to the cord-shaped heater such that the heater unit forms a flat shape.

2. The method for manufacturing a heater unit as set forth in claim 1 wherein the pair of the substrates are bonded together by an adhesive layer that is composed only from a pressure-sensitive adhesive.

3. The method for manufacturing a heater unit as set forth in claim 1 wherein the cord-shaped heater includes on an outmost layer thereof a thermal fusible region.

4. The method for manufacturing a heater unit as set forth in claim 1 wherein:
the pair of the substrates are bonded together by an adhesive layer that is composed only from a pressure-sensitive adhesive; and
the cord-shaped heater includes on an outmost layer thereof a thermal fusible region.

* * * * *